(12) United States Patent
Fenn (10) Patent No.: US 8,531,461 B2
(45) Date of Patent: Sep. 10, 2013

(54) PORTABLE ELECTRONIC DEVICE AND METHOD OF CONTROLLING SAME

(75) Inventor: John Barry Fenn, Mandelien-la-Napoule (FR)

(73) Assignee: BlackBerry Limited, Waterloo (CA)

( * ) Notice: Subject to any disclaimer, the term of this patent is extended or adjusted under 35 U.S.C. 154(b) by 875 days.

(21) Appl. No.: 12/569,393

(22) Filed: Sep. 29, 2009

(65) Prior Publication Data

US 2011/0074790 A1 Mar. 31, 2011

(51) Int. Cl.
*G06T 11/00* (2006.01)
*H04M 1/00* (2006.01)

(52) U.S. Cl.
USPC .......................................... 345/467; 455/566

(58) Field of Classification Search
None
See application file for complete search history.

(56) References Cited

U.S. PATENT DOCUMENTS

| | | | |
|---|---|---|---|
| 4,651,300 A * | 3/1987 | Suzuki et al. | 715/257 |
| 6,073,036 A | 6/2000 | Heikkinen | |
| 6,211,856 B1 | 4/2001 | Choi | |
| 6,466,203 B2 | 10/2002 | Van Ee | |
| 6,473,006 B1 | 10/2002 | Yu et al. | |
| 7,266,394 B2 | 9/2007 | Carlson | |
| 7,336,263 B2 | 2/2008 | Valikangas | |
| 7,429,988 B2 | 9/2008 | Gonsalves | |
| 7,580,731 B2 * | 8/2009 | Kim et al. | 455/566 |
| 2004/0176139 A1 | 9/2004 | Wang | |
| 2006/0111142 A1 | 5/2006 | Kim | |
| 2007/0260981 A1 | 11/2007 | Kim | |
| 2008/0096610 A1 | 4/2008 | Shin | |
| 2008/0169942 A1 | 7/2008 | Burstrom | |
| 2008/0253757 A1 | 10/2008 | Bells | |
| 2009/0089707 A1 | 4/2009 | Knowles | |

FOREIGN PATENT DOCUMENTS

| | | |
|---|---|---|
| CN | 1779776 A | 5/2006 |
| EP | 1729262 A | 12/2006 |
| EP | 1729262 A2 | 12/2006 |
| EP | 1777617 A | 4/2007 |
| WO | 2007004853 | 1/2007 |

OTHER PUBLICATIONS

English translation of the First Office Action mailed May 3, 2012; in corresponding Republic of China patent application No. 201010297237.2.
First Office Action mailed May 3, 2012; in corresponding Republic of China patent application No. 201010297237.2.
English abstract for CN 1779776, published May 31, 2006 and retrieved on Jun. 5, 2012.
09171689.4 European Search Report dated Mar. 8, 2010.
http://www.mobiletopsoft.com/board/2369/zoomboard-2-02-helps-you-type-better.html; retrieved on Oct. 23, 2009.
http://www.simonblog.com/2008/08/11/iphone-tips-keyboard-shortcut-navigation-tricks/; retrieved on Oct. 23, 2009.
http://www.filebuzz.com/fileinfo/38637/Magnifying_Glass_Pro.html; retrieved on Oct. 23, 2009.

* cited by examiner

*Primary Examiner* — Ryan R Yang
(74) *Attorney, Agent, or Firm* — Novak Druce Connolly Bove + Quigg LLP (57) ABSTRACT

A method of controlling a portable electronic device includes receiving a selection of a character of a string at the portable electronic device, rendering the character at a first font size on a display of the portable electronic device, and re-rendering the character at a second font size when a subsequent selection of a subsequent character of a new string is received.

17 Claims, 6 Drawing Sheets

PORTABLE ELECTRONIC DEVICE AND METHOD OF CONTROLLING SAME

FIELD OF TECHNOLOGY

The present disclosure relates to portable electronic devices and control of the portable electronic devices in rendering characters on a display thereof.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular phones, smart phones, Personal Digital Assistants (PDAs), and laptop computers Portable electronic devices such as PDAs or smart phones are generally intended for handheld use and ease of portability. Smaller devices are generally desirable for portability. Such devices are therefore generally small and have limited space for user input and output devices, such as the keyboard or display, respectively.

Improvements in portable electronic devices are desirable.

BRIEF DESCRIPTION OF THE DRAWINGS

Embodiments of the present disclosure will now be described, by way of example only, with reference to the attached Figures, in which.

DETAILED DESCRIPTION

The following describes a method of controlling a portable electronic device. The method includes receiving a selection of a character of a string at an input device of the portable electronic device, rendering the character at a first font size on a display of the portable electronic device, and re-rendering the character at a second font size when a subsequent selection of a subsequent character of a new string is received. A string may comprise a single or multiple characters other than a space.

Each character of a string is rendered at an enlarged font size and is maintained at the enlarged font size until a threshold time is passed or until a character of a new string is entered. When a string is completed by entry of a space, the completed string is rendered at the enlarged font size until a character of a new string is entered or until the threshold time is reached. Therefore, if the characters are rendered at the normal font size when a space is entered, the previous string is re-rendered at the enlarged font size. Rendering at the enlarged font size is useful, particularly for those with reduced vision. The enlarged font size of the entire string increases readability of the string and facilitates identification of errors in a completed string. The return to a normal or smaller font size facilitates the rendering of a greater quantity of information on a single screen on the display, without scrolling or changing screens, thereby reducing device use time, decreasing power requirement and increasing time between charging of the battery.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, PDAs, notebook computers, and the like. The portable electronic device may also be a portable electronic device without wireless communication capabilities.

Figure 1:
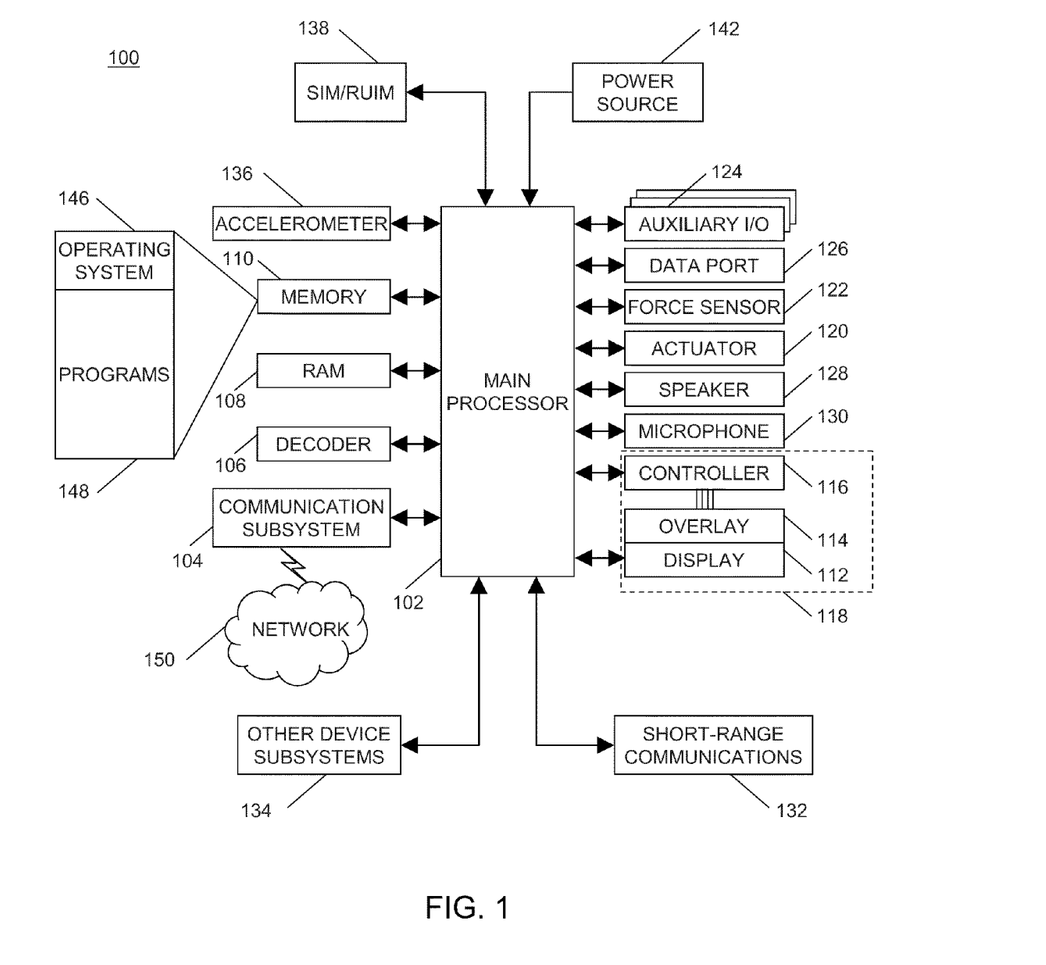
FIG. 1 is a block diagram of a portable electronic device in accordance with the present disclosure.

A block diagram of one example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

In this example, the processor 102 interacts with other devices, such as a Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 provides the user with tactile feedback.

Optionally, the actuator may comprise a mechanical dome switch actuator utilized to provide tactile feedback when the dome collapses due to imparted force and when the dome returns to the rest position after release of the switch.

Alternatively, the actuator 120 may comprise one or more piezoelectric (piezo) actuators that provide tactile feedback. Contraction of the piezo actuator(s) applies a force against the touch-sensitive display 118, opposing any force externally applied to the display 118. Each piezo actuator includes a piezoelectric device, such as a piezoelectric (PZT) ceramic disk adhered to a metal substrate. The metal substrate bends when the PZT disk contracts diametrically due to build up of charge at the PZT disk or in response to an external force applied to the touch-sensitive display 118. The charge may be adjusted by varying the applied voltage or current, thereby controlling the force applied by the piezo disks on the touch-sensitive display 118. The charge on the piezo actuator may be removed by a controlled discharge current that causes the PZT disk to expand diametrically, releasing the force thereby decreasing the force applied by the piezo disks on the touch-sensitive display 118. The charge may advantageously be removed over a relatively short period of time to provide tactile feedback to the user. Absent an external force applied to the overlay 114 and absent a charge on the piezo disk, the piezo disk may be slightly bent due to a mechanical preload.

In this example embodiment, the portable electronic device 100 includes the touch-sensitive display 118, which is configured to display information such as text, characters, symbols, images, pictures, icons and other items that may be displayed or rendered in an application. The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118 and processed by the processor 102, for example, to determine attributes of the touch including the touch location. Touch location data may include a single point of contact, such as a point at or near a center of the area of contact, or the entire area of contact for further processing. The location of a touch detected on the touch-sensitive display 118 may include x and y components, e.g., horizontal and vertical with respect to one's view of the touch-sensitive display 118, respectively. For example, the x location component may be determined by a signal generated from one touch sensor layer, and the y location component may be determined by a signal generated from another touch sensor layer. A signal is provided to the controller 116 in response to detection of a suitable object, such as a finger, thumb, or other items, for example, a stylus, pen, or other pointer, depending on the nature of the touch-sensitive display 118.

Figure 2:
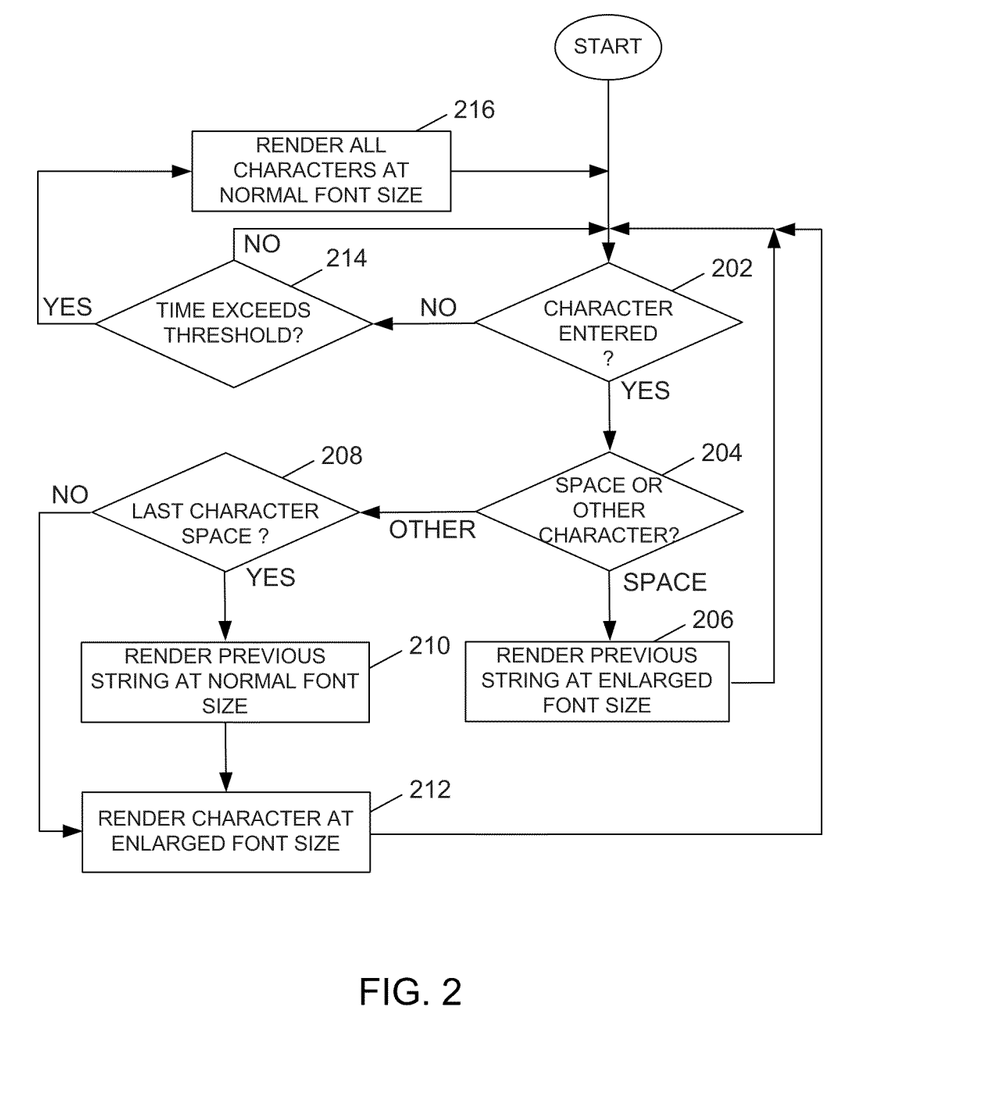
FIG. 2 is a flowchart illustrating a method of facilitating manipulation and interaction with displayed information at a portable electronic device in accordance with the present disclosure.

FIG. 2 is a flowchart illustrating a method of controlling a portable electronic device, such as the portable electronic device 100 shown and described above with reference to FIG. 1. The method of FIG. 2 may be carried out by the processor 102 executing software from a computer-readable medium. Coding of software for carrying out such steps is well within the scope of a person of ordinary skill in the art given the present description.

Characters may be entered on the display 112 of the portable electronic device in any suitable application using a keyboard such as a virtual keyboard on the touch-sensitive display. Suitable applications may include, for example, an electronic mail application, a calendar application, an address book application, a Web Browser, or any other application in which a user enters data using a keyboard. When a character is entered 202 by selection of the button or key associated with the character, the associated character is determined. When the character is determined to be a space at 204, the last string entered, prior to entry of the space, is rendered at an enlarged font size. If the previous string is already rendered at an enlarged font size no change is made. With the previous string rendered at the enlarged font size, the process continues at 202.

When the character is determined to be a character other than a space, such as a letter, number, punctuation or symbol at 204, a determination is made 208 whether or not the last character entered, prior to the current character, is a space. If the last character entered is a space, the last string entered, prior to entry of the space, is rendered 210 at a normal font size and the character entered is rendered on the display 112 at the enlarged font size 212. When the last character entered is not a space as determined at 208, the process continues at 212 and the character entered is rendered on the display 112 at the enlarged font size 212. The process then continues at 202.

When a character is not entered at 202, the time passed since the last character entry is compared 214 to a threshold and if the time passed exceeds the threshold, all characters are rendered 216 at the normal font size. Therefore, any characters rendered at the first font size are re-rendered at the second font size. If the time passed does not exceed the threshold time at 214, the process continues at 202.

Examples of a display during entry of characters in strings is shown in FIG. 3A through FIG. 3E. In these examples, an application is executed on the portable electronic device 100 in which characters are entered on a keyboard and rendered on the display 112. In each of FIG. 3A through FIG. 3E, a virtual keyboard 302 is provided to select keys for entry of associated characters, which are rendered in a character display area 304. In each of FIG. 3A through FIG. 3E, two strings, including "My new", are rendered in the character display area 304.

Figure 3A:
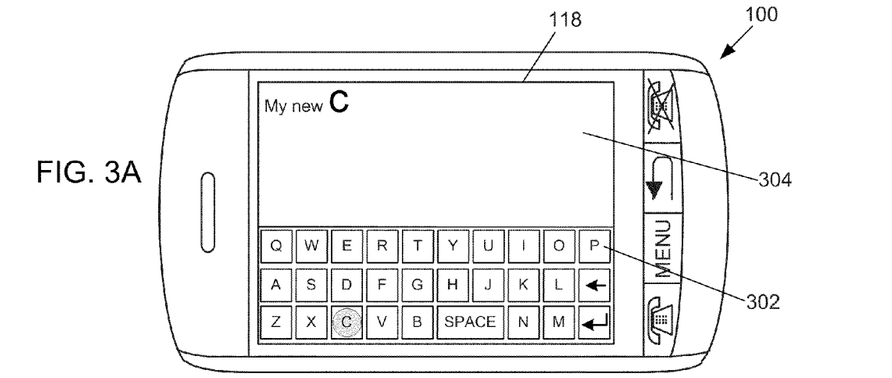
FIG. 3A to 3E illustrate an example of control of an electronic device during entry of characters in a string in accordance with the present disclosure.

As shown in FIG. 3A, a character "c" is entered 202 utilizing the virtual keyboard 302 by selection of the key associated with the character "c". When the character "c" is entered 202, a determination is made 204 that the entered character is a character other than a space. The last character prior to entry of the "c" is determined to be a space 208 and the previous string "new" is rendered 210 at the normal font size. The character "c" is rendered 212 at an enlarged font size.

Figure 3B:
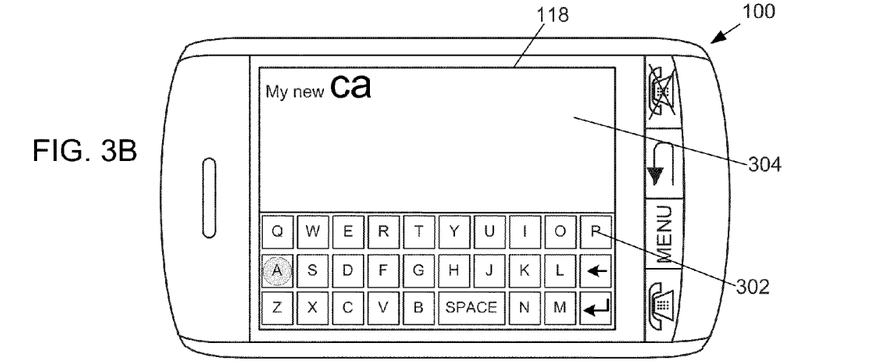

Continuing with the same example, the character "a" is entered 202 before the time passed exceeds the threshold time, as shown in FIG. 3B. The character is determined 204 to be a character other than a space and a determination is made 208 that the last character, a "c", is not a space. The character "a" is rendered 212 at the enlarged font size.

Figure 3C:
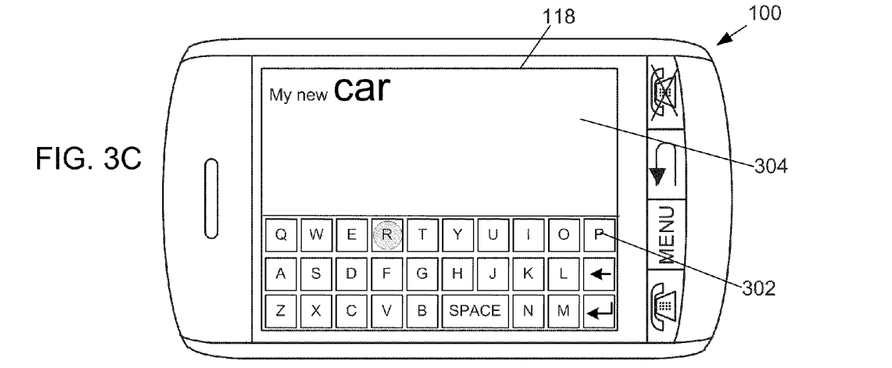

The character "r" is entered 202 before the time passed exceeds the threshold time, as shown in FIG. 3C. The character is determined 204 to be a character other than a space and a determination is made 208 that the last character, an "a", is not a space. The character "r" is rendered 212 at the enlarged font size.

Figure 3D:
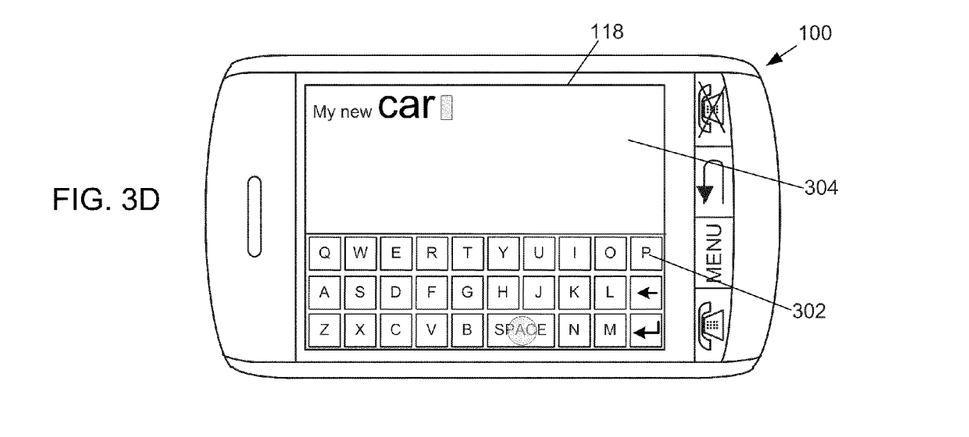

As shown in FIG. 3D, a space is entered 202 and the character is determined to be a space at 204. The previous string "car" is rendered at the enlarged font size 206. In this example, the previous string is already rendered at the enlarged font size and therefore, there is no change to the font size.

If, however, the time, after entry of the character "r" and prior to entry of the space, exceeds the threshold time, as determined at 214, all characters are rendered at the normal font size. In the example in which the characters are rendered at the normal font size, the entry of the space at 202 results in re-rendering of the previous string "car" at 206.

Figure 3E:
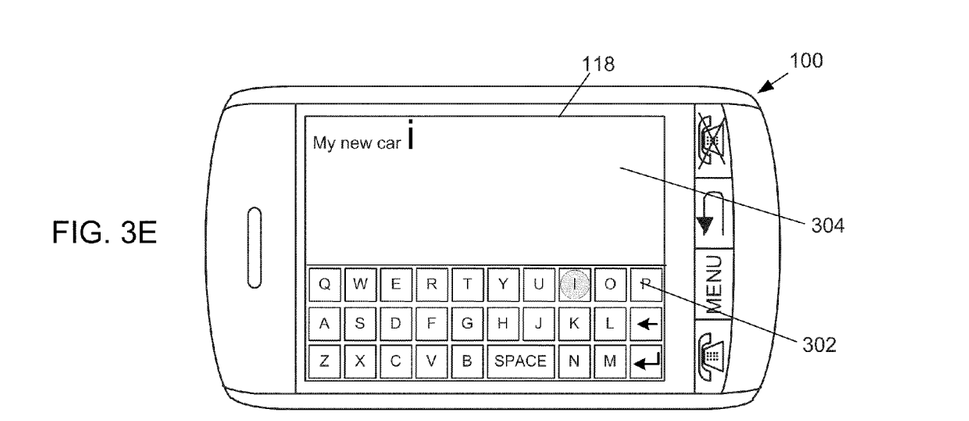

As shown in FIG. 3E, another character, an "i", is entered 202. The character is determined to be a character other than a space at 204 and a determination is made 208 that the previously entered character is a space. The previous string, which in this example is "car" is re-rendered 210 at the normal font size and the character "i" is rendered 212 at the enlarged font size.

Figure 4:
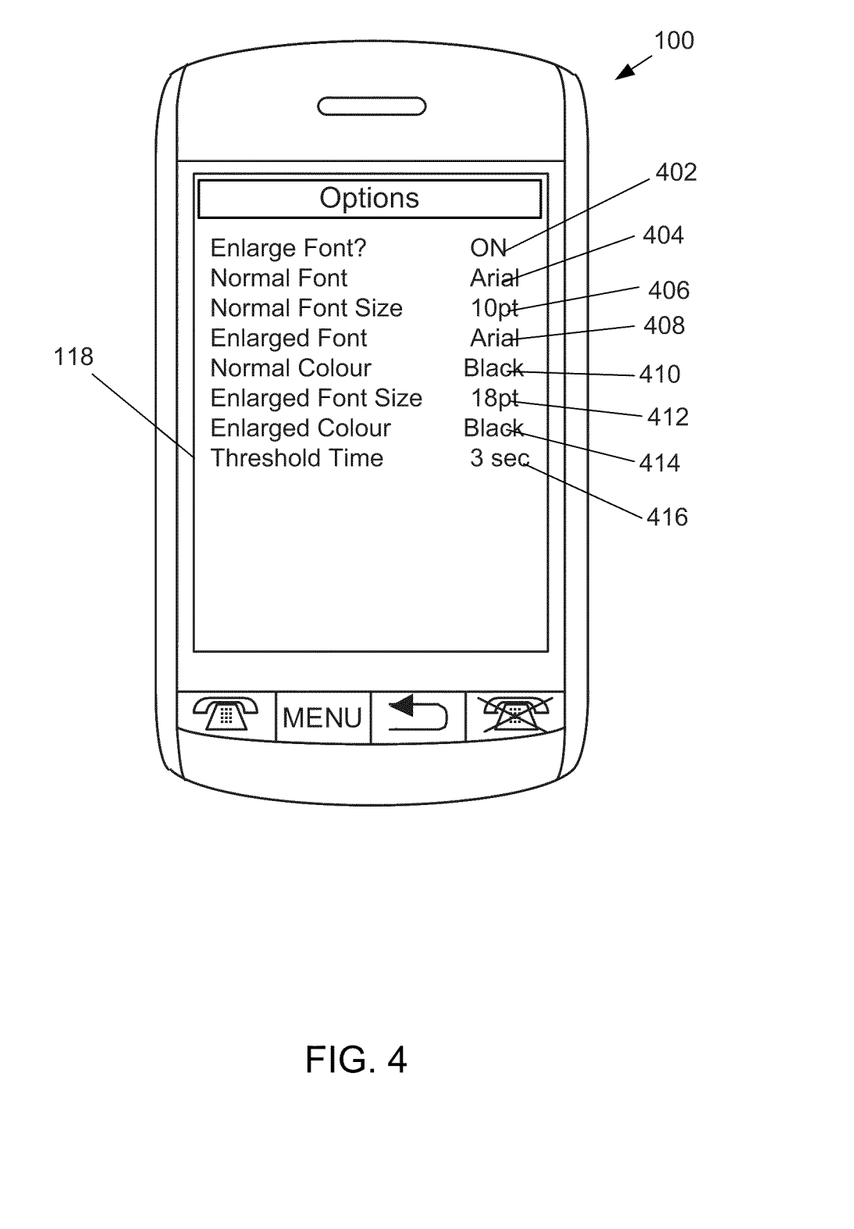
FIG. 4 shows a menu list of options in a graphical user interface at a portable electronic device in accordance with the present disclosure.

The enlarged font and font size may be set by user-selection in a graphical user interface. An example of a menu list of selectable options is shown FIG. 4, for setting fonts and font sizes. As shown in the menu list of FIG. 4, the font process shown in FIG. 2 may be turned on and off by selection of the "Enlarge Font" option 402. Other options for setting include the "Normal Font" 404 for the selecting the font, the "Normal Font Size" 406, for selecting the size of the font, the "Normal Colour" 408, for selecting the colour of the font, the "Enlarged Font" 410 for selecting the font for the enlarged characters, the "Enlarged Font Size" 412 for selecting the font size of the enlarged characters, the "Enlarged Colour" 414 for selecting the colour of the enlarged font, and the "Time Threshold" 416 for selecting the threshold time for re-rendering the enlarged font characters as normal font characters. Each of the options is may be selected for setting by the user.

Optionally, the enlarged font and font size may be pre-set, may be set based on the normal font size, or may be selected in a user interface.

Figure 5:
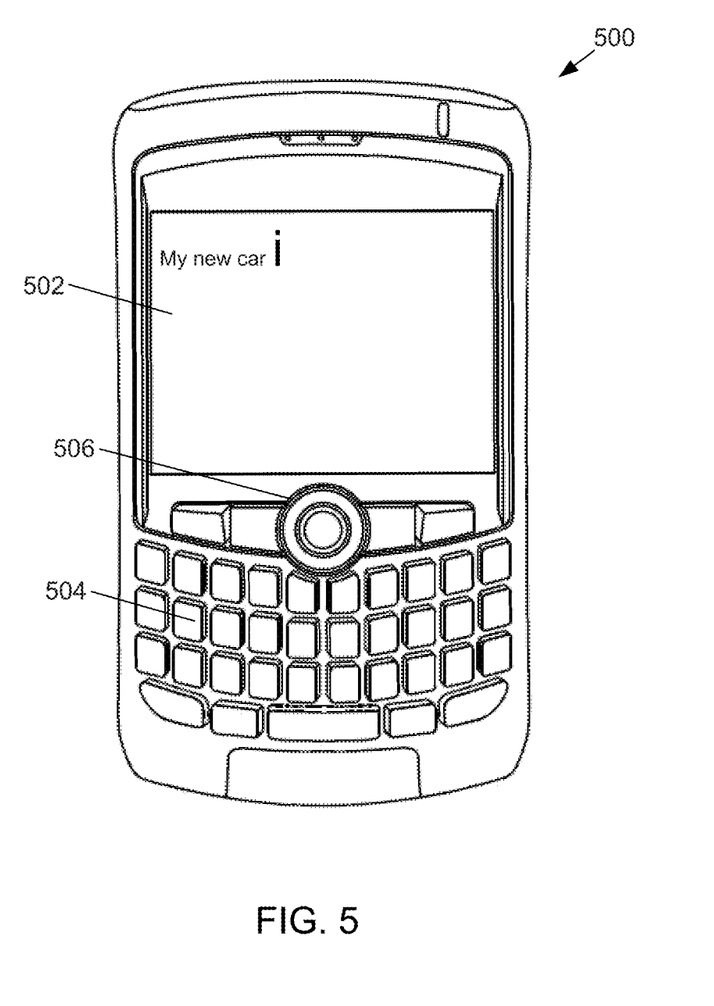
FIG. 5 illustrates another example of a portable electronic device during entry of a character in a string in accordance with the present disclosure.

In the above-described examples, the portable electronic device 100 includes a touch-sensitive display 118 for entry of characters using a virtual keyboard, for example. The present disclosure is not limited to portable electronic devices with touch-sensitive displays 118, however. FIG. 5 shows an example of another portable electronic device 500 in accordance with the present disclosure. In this example, the portable electronic device 500 includes a display 502, a physical keyboard 504 and a trackball 506 for user-input. In this example, the input device, for entry of characters, is the physical keyboard 504, rather than a touch-sensitive overlay The process described with reference to FIG. 2 may also be utilized in the portable electronic device 500.

A method of controlling a portable electronic device includes receiving a selection of a character of a string at the portable electronic device, rendering the character at a first font size on a display of the portable electronic device, and re-rendering the character at a second font size when a subsequent selection of a subsequent character of a new string is received.

A computer-readable medium has computer-readable code embodied therein. The computer-readable code is executable by a processor of a portable electronic device to carry out the above method.

An electronic device includes a memory, a display configured to display information, an input device to for receiving a selection of a character of a string at the portable electronic device, and a processor connected to the memory, the display and the input device to execute a program stored in the memory and cause the electronic device to render the character at a first font size on the display of the portable electronic device and re-render the character at a second font size when a subsequent selection of a subsequent character of a new string is received.

Advantageously, each character of a string is rendered at an enlarged font size and is maintained at the enlarged font size until a threshold time is passed or until a character of a new string is entered. When a string is completed by entry of a space, the completed string is rendered at the enlarged font size until a character of a new string is entered or until the threshold time is reached. Therefore, if the characters are rendered at the normal font size when a space is entered, the previous string is re-rendered at the enlarged font size. Rendering at the enlarged font size is useful, particularly for those with reduced vision. The enlarged font size of the entire string increases readability of the string and facilitates identification of errors in a completed string. The return to a normal or smaller font size facilitates the rendering of a greater quantity of information on a single screen on the display, without scrolling or changing screens.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method of controlling a portable electronic device, the method comprising:
  receiving a selection of a character of a string at the portable electronic device;

rendering the character at a first font size on a display of the portable electronic device; and in response to receipt of a selection of a space after the string:

re-rendering all characters of the string at a second font size on the display, wherein the second font size is enlarged relative to the first font size; and re-rendering all the characters of the string at the first font size in response to a selection of a subsequent character of a new string on the display.

2. The method according to claim 1, wherein rendering the character at the first font size comprises rendering the character at the first font size when a time threshold is reached.

3. The method according to claim 2, wherein the time threshold is selectable for setting in a user interface.

4. The method according to claim 1, wherein the first font size is selectable for setting in a user interface.

5. The method according to claim 1, wherein the second font size is selectable for setting in a user interface.

6. The method according to claim 1, wherein the first font is selectable for setting in a user interface.

7. The method according to claim 1, wherein the second font is selectable for setting in a user interface.

8. The method according to claim 1, wherein a color of the characters rendered at the first font size is selectable for setting in a user interface.

9. The method according to claim 1, wherein a color of the characters rendered at the second font size is selectable for setting in a user interface.

10. The method according to claim 1, wherein the character comprises one of an alphabetical, a numerical and a symbolic character.

11. The method according to claim 1, wherein the character comprises a punctuation character.

12. A computer-readable storage device having computer-readable code executable by a processor of a portable electronic device to:

render a plurality of characters of a string, at a first font size on a display of the portable electronic device; and in response to receipt of a selection of a space after the string:

re-render all of the characters of the string at a second font size on the display, wherein the second font size is enlarged relative to the first font size; and re-render all of the characters of the string at the first font size in response to a selection of a subsequent character of a new string on the display.

13. An electronic device comprising:

a memory;

a display configured to display information; and an input device configured to receive a selection of a character of a string at the portable electronic device; and a processor connected to the memory, the display and the input device, to execute a program stored in the memory to cause the electronic device to:

render the character at a first font size on the display; and in response to receipt of a selection of a space after the string:

re-render all characters of the string at a second font size on the display, wherein the second font size is enlarged relative to the first font size; and re-render all the characters of the string at the first font size in response to a selection of a subsequent character of a new string on the display.

14. The electronic device according to claim 13, wherein the character is rendered at the first font size when a time threshold is reached.

15. The electronic device according to claim 14, wherein the time threshold is selectable for setting in a user interface.

16. The electronic device according to claim 13, wherein the first font size is selectable for setting in a user interface.

17. The electronic device according to claim 13, wherein the second font size is selectable for setting in a user interface.

* * * * *